(12) United States Patent
Garcia, II et al.

(10) Patent No.: US 8,112,736 B2
(45) Date of Patent: Feb. 7, 2012

(54) DIFFERENTIAL VOLTAGE DEFECTIVITY MONITORING METHOD

(75) Inventors: John D. Garcia, II, Rowlett, TX (US);
Vipin P. Madangarli, Carrollton, TX (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 12/896,869

(22) Filed: Oct. 2, 2010

(65) Prior Publication Data
US 2011/0047523 A1    Feb. 24, 2011

Related U.S. Application Data

(62) Division of application No. 11/982,252, filed on Oct. 31, 2007, now Pat. No. 7,808,265.

(60) Provisional application No. 60/856,074, filed on Nov. 1, 2006.

(51) Int. Cl.
*G06F 17/50* (2006.01)
(52) U.S. Cl. .................. 716/136; 716/132
(58) Field of Classification Search .................. None
See application file for complete search history.

(56) References Cited

U.S. PATENT DOCUMENTS

| 5,740,086 | A * | 4/1998 | Komoto ................ 702/120 |
|---|---|---|---|
| 6,119,250 | A | 9/2000 | Nishimura et al. |
| 6,150,831 | A | 11/2000 | Asai et al. |
| 6,424,142 | B1 | 7/2002 | Kato et al. |
| 6,864,693 | B2 | 3/2005 | Kondo et al. |
| 7,038,482 | B1 | 5/2006 | Bi |
| 7,605,598 | B2 | 10/2009 | Kelly |
| 7,730,434 | B2 * | 6/2010 | Aghababazadeh et al. ... 716/136 |
| 2006/0232266 | A1 | 10/2006 | Kelly |

OTHER PUBLICATIONS

Cote et al., "Layout Printability Optimization using a Silicon Simulation Methodology," 2004 Proc. 5$^{th}$ Int'l Symposium Quality Electronic Design, pp. 159-164.*

Doong et al. "The Short-Loop Process Tuning & Yield Evaluation by Using the Addressable Failure Site Test Structures (AFS-TS)," 2000 Proc. 9$^{th}$ Int'l Symposium Semiconductor Manufacturing, pp. 195-198.*

Duan et al., "Design and Use of Memory-Specific Test Structures to Ensure SRAM Yield and Manufacturability," 2003 Proc. 4$^{th}$ Int'l Symposium Quality Electronic Design, pp. 119-124.*

(Continued)

*Primary Examiner* — Leigh Garbowski
(74) *Attorney, Agent, or Firm* — Fenwick & West LLP

(57) ABSTRACT

A method uses a differential voltage response to identify fabrication process defects that would result if an IC design is fabricated (without re-designing to correct such defects). The method uses two stacks, whose respective outputs may be compared by a comparator, and comparator's output used to determine defectivity. In some embodiments, each stack includes a first-type device (e.g. a p-channel device) and at least two second-type devices (e.g. n-channel devices). The first-type device is used as a current source or as a select switch (depending on the mode of operation of the differential voltage defectivity monitoring circuit). One second-type device may be used as a select switch and for back-bias control, while another second-type device may be used as a blocking switch and/or a select switch. The method may use an addressable array of multiple test structures that have digitally multiplexed control lines, in some embodiments.

13 Claims, 15 Drawing Sheets

OTHER PUBLICATIONS

Hamamoto et al., "Measurement of Contact Resistance Distribution Using a 4k-Contacts Array," IEEE Trans. on Semiconductor Manufacturing, vol. 9, No. 1, Feb. 1996, pp. 9-14.*

Miyamoto et al., "Yield Management Methodology for SoC Vertical Yield Ramp," 2000 Tech.Digest Int. Electron Devices Meeting, pp. 841-844.*

Newhart et al., "Defect Diagnostic Matrix—A Defect Learning Vehicle for Submicron Technologies," 1988 IEEE Proc. on Microelectronic Test Structures, vol. 1, No. 1, pp. 103-106.*

Walton et al., "A Novel Approach for Reducing the Area Occupied by Contact Pads on Process Control Chips," Proc. IEEE 1990 Int'l Conference on Microelectronic Test Structures, vol. 3, pp. 75-80.*

Ward et al., "The Use of a Digital Multiplexer to Reduce Process Control Chip Pad Count," Proc. IEEE 1992 Int'l Conference on Microelectronic Test Structures, vol. 5, pp. 129-133.*

Weber, "Yield Learning and the Sources of Profitability in Semiconductor Manufacturing and Process Development," IEEE Trans. on Semiconductor Manufacturing, vol. 17, No. 4, Nov. 2004, pp. 590-596.*

Yamamoto et al., "Development of a Large-Scale TEG for Evaluation and Analysis of Yield and Variation," IEEE Trans. on Semiconductor Manufacturing, vol. 17, No. 2, May 2004, pp. 111-122.*

Yeric et al., "Infrastructure for Successful BEOL Yield Ramp, Transfer to Manufacturing, and DFM Characterization at 65 nm and Below," 2005 IEEE Design & Test of Computer, vol. 22, pp. 232-239.*

U.S. Appl. No. 11/982,252, pp. 44.

U.S. Appl. No. 60/856,074, pp. 25.

Karthikeyan, M. et al. "A 65nm random and systematic yield ramp infrastructure utilizing a specialized addressable array with integrated analysis software", Microelectronic Test Structures, IEEE International Conference on Mar. 6-9, 2006, pp. 104-109.

Office Action dated Feb. 26, 2010 in U.S. Appl. No. 11/982,252, pp. 6.

Amendment dated Mar. 26, 2010 in U.S. Appl. No. 11/982,252, p. 1.

Office Action dated Apr. 15, 2010 in U.S. Appl. No. 11/982,252, pp. 10.

Notice of Allowance and Examiner's Interview Summary dated Jul. 30, 2010 in U.S. Appl. No. 11/982,252, pp. 9.

Applicant's Summary of Interview with Examiner dated Aug. 30, 2010 in U.S. Appl. No. 11/982,252, p. 1.

* cited by examiner

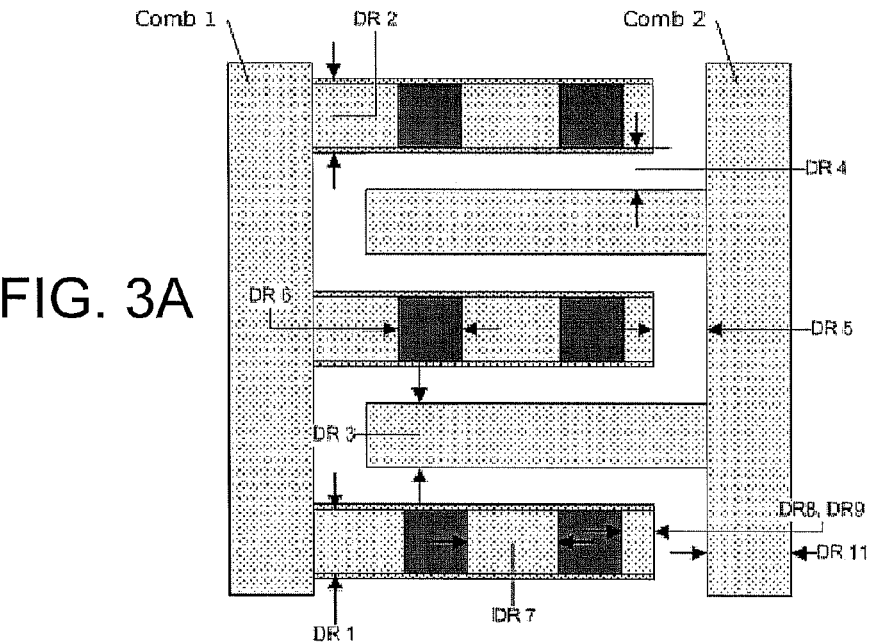

| DR | Description |
|---|---|
| 1 | Comb 1 Bottom Metal Tine Width (μm) |
| 2 | Comb 1 Top Metal Tine Width (μm) |
| 3 | Comb 2 Metal Tine Width (μm) |
| 4 | Comb Spacing (μm) |
| 5 | Comb End Space (μm) |
| 6 | Via Size (μm) |
| 7 | Via Spacing Along Comb (μm) |
| 8 | Bottom Metal Via End Overlap (μm) |
| 9 | Top Metal Via End Overlap (μm) |
| 10 | Metal Misalignment in Y (Up -> Positive And Down -> Negative) (μm) |
| 11 | Spine Width (μm) |
| SR 1 | Comb 1 Bottom Layer |
| SR 2 | Comb 1 Top Layer |
| SR 3 | Comb 2 Layer |
| SR 4 | Comb Orientation (0 or 90) |

FIG. 3C

| ID | IO:ROW | DR1 | DR2 | DR3 | DR4 | DR5 | DR6 | DR7 | DR8 | DR9 | DR10 | DR11 | SR1 | SR2 | SR3 | SR4 |
|---|---|---|---|---|---|---|---|---|---|---|---|---|---|---|---|---|
| C1 | 13:70 | 0.1 | 0.1 | 0.1 | 0.090 | 0.2 | 0.10 | 0.1 | 0.04 | 0.05 | 0.00 | 0.2 | M1 | M2 | M1 | 0 |
| C2 | 13:71 | 0.1 | 0.1 | 0.1 | 0.090 | 0.2 | 0.11 | 0.1 | 0.04 | 0.05 | 0.00 | 0.2 | M1 | M2 | M1 | 0 |
| C3 | 13:72 | 0.1 | 0.1 | 0.1 | 0.090 | 0.2 | 0.12 | 0.1 | 0.04 | 0.05 | 0.00 | 0.2 | M1 | M2 | M1 | 0 |
| C4 | 13:73 | 0.1 | 0.1 | 0.1 | 0.090 | 0.2 | 0.13 | 0.1 | 0.04 | 0.05 | 0.00 | 0.2 | M1 | M2 | M1 | 0 |
| C5 | 13:74 | 0.1 | 0.1 | 0.1 | 0.090 | 0.2 | 0.14 | 0.1 | 0.04 | 0.05 | 0.00 | 0.2 | M1 | M2 | M1 | 0 |
| C6 | 13:75 | 0.1 | 0.1 | 0.1 | 0.090 | 0.2 | 0.10 | 0.1 | 0.04 | 0.05 | 0.00 | 0.2 | M1 | M2 | M1 | 90 |
| C7 | 13:76 | 0.1 | 0.1 | 0.1 | 0.090 | 0.2 | 0.11 | 0.1 | 0.04 | 0.05 | 0.00 | 0.2 | M1 | M2 | M1 | 90 |
| C8 | 13:77 | 0.1 | 0.1 | 0.1 | 0.090 | 0.2 | 0.12 | 0.1 | 0.04 | 0.05 | 0.00 | 0.2 | M1 | M2 | M1 | 90 |
| C9 | 13:78 | 0.1 | 0.1 | 0.1 | 0.090 | 0.2 | 0.13 | 0.1 | 0.04 | 0.05 | 0.00 | 0.2 | M1 | M2 | M1 | 90 |
| C10 | 13:79 | 0.1 | 0.1 | 0.1 | 0.090 | 0.2 | 0.14 | 0.1 | 0.04 | 0.05 | 0.00 | 0.2 | M1 | M2 | M1 | 90 |
| C11 | 13:80 | 0.1 | 0.1 | 0.1 | 0.090 | 0.2 | 0.10 | 0.1 | 0.04 | 0.05 | -0.03 | 0.2 | M1 | M2 | M1 | 0 |

TDROM, 65nm, 8Mb, 3.2B Vias per wafer (200mm)

DIFFERENTIAL VOLTAGE DEFECTIVITY MONITORING METHOD

CROSS-REFERENCE TO PARENT APPLICATION AND PROVISIONAL APPLICATION

This application is a divisional application of, and claims priority to, U.S. patent application Ser. No. 11/982,252 filed on Oct. 31, 2007 now U.S. Pat. No. 7,808,265 by John D. Garcia II and Vipin P. Madangarli entitled "DIFFERENTIAL VOLTAGE DEFECTIVITY MONITORING CIRCUIT" which in turn claims priority to US Provisional Patent Application No. 60/856,074 filed on Nov. 1, 2006 entitled "DIFFERENTIAL VOLTAGE DEFECTIVITY MONITORING CIRCUIT" also filed by John D. Garcia II and Vipin P. Madangarli, and both these priority applications are hereby incorporated by reference herein in their entirety.

BACKGROUND

During semiconductor manufacturing from technology development to full production it is imperative to be able to determine the limits of a particular process step as well as the extent of systematic and random defects encountered in order to minimize yield loss. It is difficult to obtain wide range of systematic and random back end of line (BEOL) or front end of line (FEOL) defectivity information as well as detailed process window information from conventional stand alone process control monitoring circuits without using up significant silicon area. Mismatch and process shift error makes conventional absolute value voltage monitoring inaccurate without specific additional reference measurements.

SUMMARY

One or more of above-discussed conditions are eliminated or minimized using a circuit, called "differential defectivity monitoring circuit" in accordance with the invention, as discussed below.

Specifically, a differential defectivity monitoring circuit in some embodiments of the invention uses a differential voltage response to identify fabrication process defects that would result if an IC design is fabricated (without re-designing to correct such defects). The differential defectivity monitoring circuit includes two stacks, whose respective outputs may be coupled to two inputs of a comparator, and output of the comparator is used to determine defectivity. In some embodiments, each stack includes one p-channel device (also called "first-type" device) and at least two n-channel devices (also called "second-type" devices). Some embodiments of stacks include three or more n-channel devices in addition to the one p-channel device.

As will be apparent to the skilled artisan, alternative embodiments may use stacks of one n-channel device and two (or three or more) p-channel devices. The first-type device is used as a current source or as a select switch (depending on the mode of operation of the differential voltage defectivity monitoring circuit). In each stack, one second-type device is used as a select switch and for back-bias control, while another second-type device is used as a blocking switch and/or a select switch. In some embodiments, yet another second-type device is used in certain embodiments of the differential voltage defectivity monitoring circuit in applications where multiple devices are used for block control or device isolation.

A computer is programmed in accordance with the invention to automatically use one or more embodiments of a differential voltage defectivity monitoring circuit. Such circuits may be included as elements of an array (called "technology development read-only-memory" or TDROM) that may be located in, for example, a scribe line of a wafer. After the wafer is fabricated, data from such a circuit can be used in any electronic design automation (EDA) tool, such as, for example the following tools available from Synopsys, Inc: (1) Test Chip Advantage (TCA) tool, (2) PrimeYield tool, (3) CMP Advantage and (4) Lithography Compliance Check (LCC) tool, (5) STAR-RC, and (6) standard design flow for evaluation of customer designs, based on wafer fabrication processes.

BRIEF DESCRIPTION OF THE DRAWINGS

FIG. 3A illustrates, a schematic of a systematic test structure to measure the process window for via-metal shorts using the circuit of FIGS. 1 and/or 2.

FIG. 3B illustrates, in a first table, description of design parameters for the schematic in FIG. 3A.

FIG. 3C illustrates, in a second table, an excerpt based on the first table of FIG. 3B, wherein the variables in this example are via size (DR6), via-to-metal misalignment (DR10) and comb orientation (SR4).

DETAILED DESCRIPTION

Figure 1:
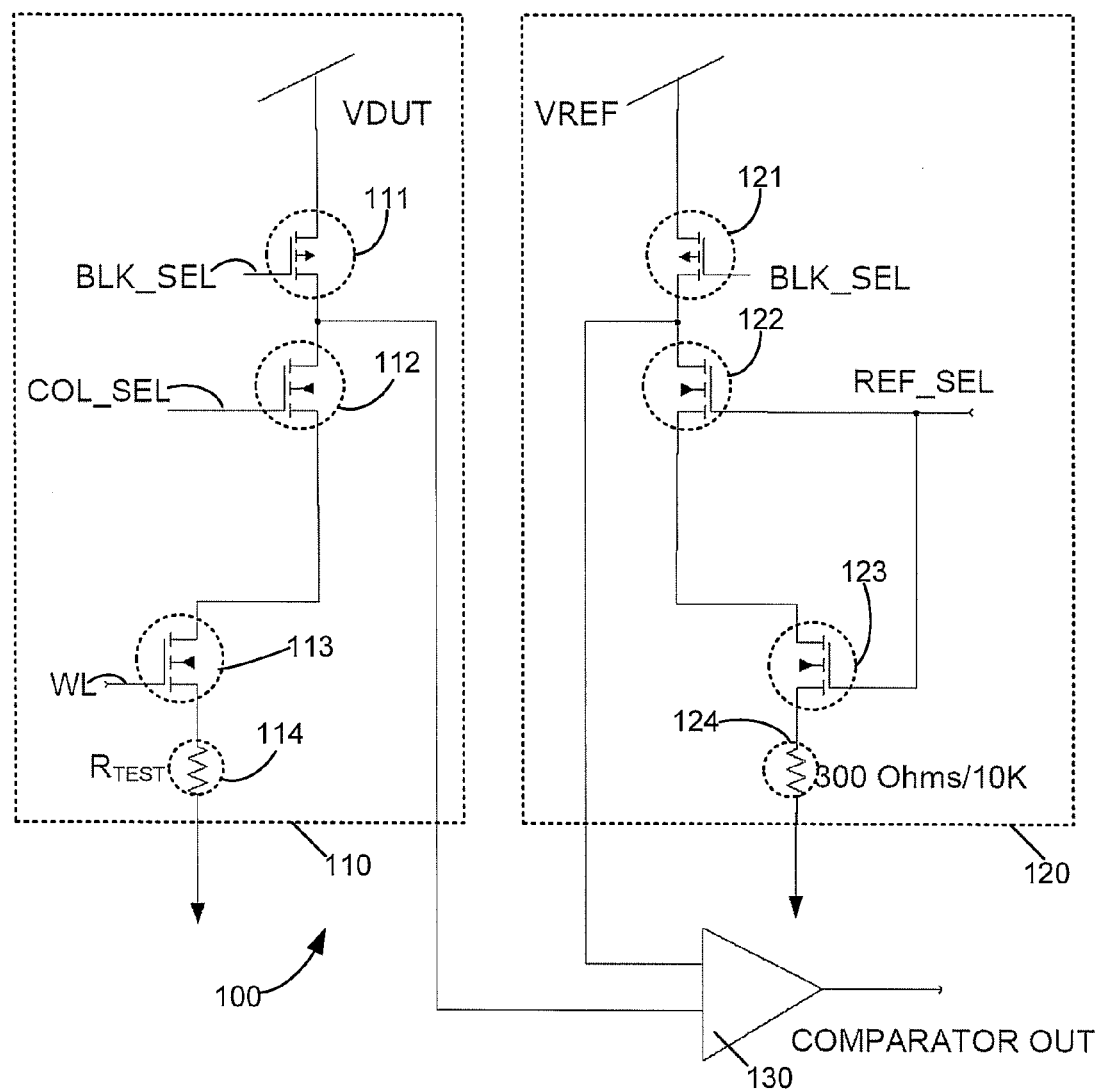
FIG. 1 illustrates a differential voltage defectivity monitoring circuit in accordance with the invention.

Certain embodiments of the invention use the circuitry and/or methodology of the type described in a paper entitled "A 65 nm random and systematic yield ramp infrastructure utilizing a specialized addressable array with integrated analysis software" by Karthikeyan, M. Fox, S. Cote, W. Yeric, G. Hall, M. Garcia, J. Mitchell, B. Wolf, E. and Agarwal, S. published in Microelectronic Test Structures, 2006 IEEE International Conference on 6-9 Mar. 2006, at page(s): 104-109 that is incorporated by reference herein in its entirety. Note that any description in this paper, of the invention as per claims below, originated from the inventors of the current patent application.

In some embodiments of the invention, a Differential Voltage Defectivity Monitoring Circuit 100 can be used to detect open and short fails to qualify the limits of a process step as well as determine systematic and random defectivity patterns from a large number of experiments. Certain embodiments of the differential voltage defectivity monitoring circuit 100 are designed to provide gross analog detection of partial or complete open and short failures inside a typical semiconductor process. Differential defectivity monitoring circuit 100 of several embodiments uses a differential voltage response to identify fabrication process defects that would result if an IC design is fabricated (without re-designing to correct such defects).

Specifically, a differential defectivity monitoring circuit 100 (see FIG. 1) includes two stacks 110 and 120, whose respective output lines are coupled to two input lines of a comparator 130, and a signal on an output line of the comparator is measured, and the measurement used to determine defectivity (while power is supplied to both stacks). In some embodiments, stack 110 includes one p-channel device 111 (which can be, for example, a transistor) and two n-channel devices 112 and 113 (also transistors in this example). The p-channel device 111 of stack 110 is supplied power from a source at voltage VDUT. An output line of stack 110 is coupled between the p-channel device 111 and one n-channel device 112, while a device under test (DUT) 114 is coupled to the other n-channel device 113. Moreover, the two n-channel devices 112 and 113 are coupled to one another, e.g. the source of transistor 112 is coupled to the drain of transistor 113. The gates of transistors 111, 112 and 113 are connected to control lines labeled BLK_SEL, COL_SEL and WL. Digitally multiplexing control lines labeled BLK_SEL, COL_SEL and WL selects the data from testing of DUT 114 at an appropriate time, for comparison with a corresponding reference signal (discussed next). As will be apparent to the skilled artisan, DUT 114 is just one of several such DUTs that are selectable by appropriately supplying signals on control lines BLK_SEL, COL_SEL and WL.

Stack 120 is configured similar to stack 110 described above in the previous paragraph. For example, stack 120 includes one p-channel device 121 (which can be, for example, a transistor) and two n-channel devices 122 and 123 (also transistors in this example). The three devices 121, 122 and 123 are connected in a manner similar to the connection of devices 111, 112 and 113 respectively. However, instead of DUT 114, a reference device (e.g. a resistor) is used in stack 120. Moreover, in the example illustrated in FIG. 1, the gates of both transistors 122 and 123 are driven by a common control signal, received on line REF_SEL. Moreover, reference stack 120 receives power from its own source, which supplies power to p-type device 120 at reference voltage VREF.

Figure 2:
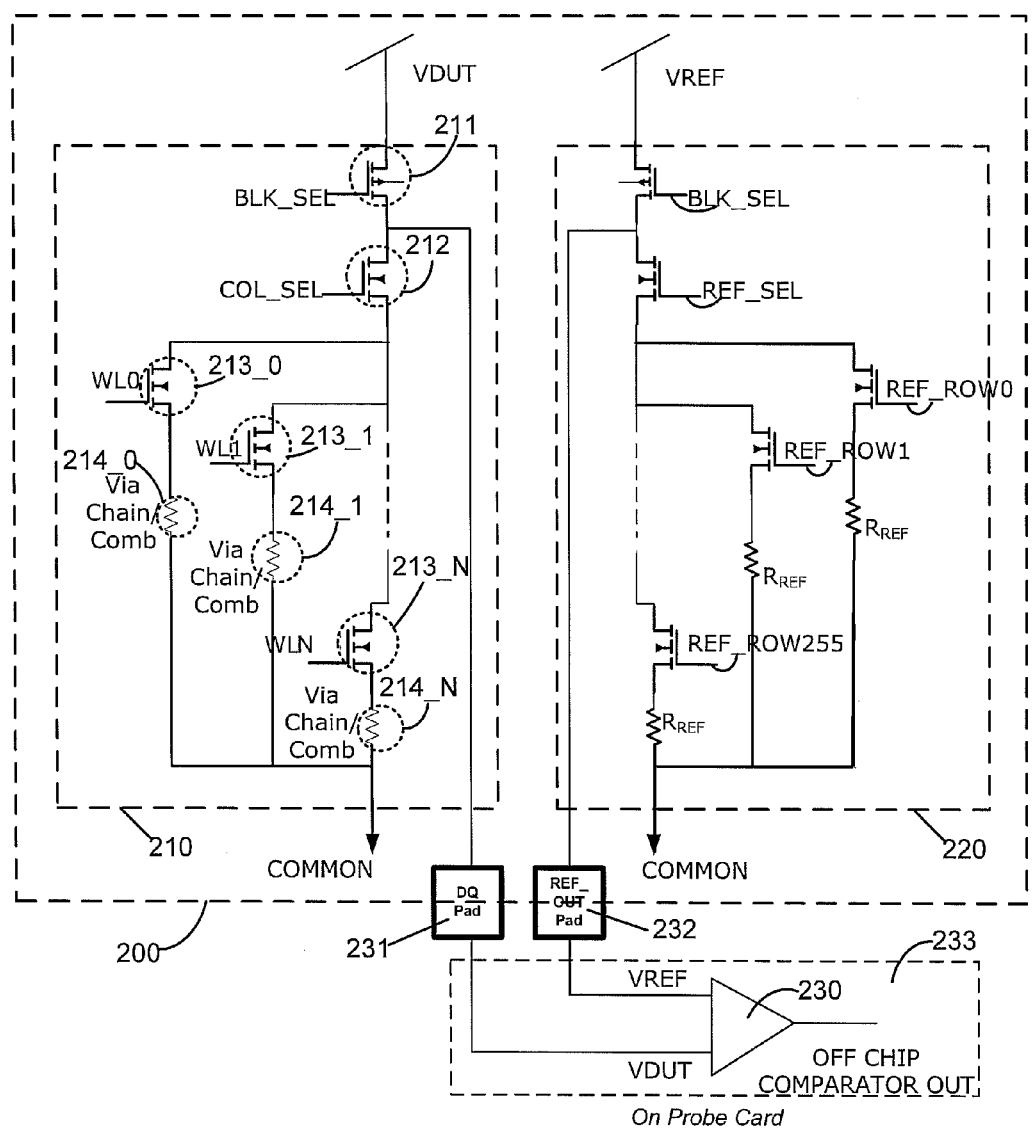
FIG. 2 illustrates another differential voltage defectivity monitoring circuit in accordance with the invention which is implemented in an addressable array.

However, different signals are applied in other embodiments to the gates of devices 122 and 123 (which gates are not connected to one another, unlike the illustration in FIG. 1, see the illustration in FIG. 2). By activating various control signals BLK_SEL, COL_SEL, WL and REF_SEL as necessary, an appropriate pair of signals are output to comparator 130, which therefore permits identification of various defects corresponding to the individual DUTs. In some embodiments of the type illustrated in FIG. 2, a number of DUTs 214_0 to 214_N (e.g. 256 in number) are connected via a corresponding number of n-channel devices 2130 to 213_N to a common n-channel device 212. N-channel device 212 is connected to the p-channel device 211 (with an output line there between). Accordingly, circuit 200 (FIG. 2) forms an addressable array which can be used to build a TDROM. This is achieved in one illustrative example, by using up a reasonably small silicon area generally less than 9 mm×11 mm for a full size (4 Meg or 8 Meg) TDROM and approximately 7 mm×80 μm for a scribe TDROM.

In the embodiment of FIG. 2, the output lines from stacks 220 and 230 are coupled via pads 231 and 232 to comparator 230, because comparator 230 of this embodiment is located off-chip, in a probe card 233. Note, however, that the invention does not require an off-chip comparator, as illustrated by the absence of pads in FIG. 1. Accordingly, depending on the embodiment, either on-chip or off-chip comparator may be used. Note that the reference numerals in FIG. 2 are derived from the corresponding reference numerals in FIG. 1, by adding 100 thereto.

Accordingly some embodiments use an independently powered dual stack column architecture for a read only memory like array 200, consisting of a DUT column 210 and a reference column 220 and an external probe card comparator 230 to determine pass/fail based on whether a DUT is more or less resistive than the reference device. The unique design of this circuit allows compensation for imbalances between the interconnect resistances and other mismatches between two stacks and essentially calibrate the circuit, for example for effective comparison of a DUT's resistance to a reference device's resistance.

Variation of the DUT experiment types and design in an array of a TDROM circuit allows the TDROM circuit to be not only used to quantify failure mechanisms that impact process yield, but also to qualify the limits of a process step against random, systematic and soft or hard failure patterns. As will be apparent from comparison of FIGS. 1 and 2, the circuit is designed to operate, either as a standalone circuit 100 or incorporated in a large area test circuit 200 that is digitally multiplexed (referred to as TDROM) allowing a scalable experiment set to be placed in an area of a wafer that is less than the area occupied by standard parametric test circuits. Hence, in some embodiments, circuit 200 is incorporated in and typically delivered as a product that is generally less than 9 mm×11 mm for a full size (4 Meg or 8 Meg) TDROM and approximately 7 mm×80 μm for a scribe TDROM.

The novel measurement circuit of FIG. 1 uses independently powered dual measurement stack column architecture for a read only like memory array, consisting of a DUT column and a reference column. The differential defectivity circuit can be measured with conventional voltage and/or current based equipment at the independent outputs or with a preferred method of an external probe card A/D converter formed through the use of a single comparator per addressed BIT (circuits have been created with single BIT or BYTE wide addressing schemes). Pass/fail criteria is based on whether DUT output port is higher or lower voltage value than a selected reference voltage value at the reference output port. The bias strings provide a relative output voltage comparison which is proportional to the resistance of the DUT vs. the resistance of the reference. The unique design of this differential defectivity circuit allows one to compensate for imbalances between the interconnect resistances, transistor mismatches as well as process shifts between two stacks and essentially calibrate the circuit for effective comparison of DUT resistance to reference resistance.

By using the differential voltage value (VREF-VDUT) or (VDUT-VREF) we are able to shift the differential voltage to any level nominally inside the process voltage range to eliminate noise effects as well as provide increased linearity of measurement over a design range and still provide extreme measurement speed (typically in the µs range, limited only by design drive current, comparator speed and accuracy requirement) compared to ms range for a typical analog technique.

The design of the circuit 200 with accompanying test card 233 allows one to dramatically increase the practical test speed over conventional analog voltage measurement equipment (standard parametric test equipment). Excellent defect localization, to +/−3 µm, and by layer. Through the use of the independently powered stacks 210 and 220, design variations as well as test variations allow multiple modes of operation of circuit 200 to be achieved: (a) Non-calibrated voltage operation: VREF & VDUT stacks 220 and 210 respectively are powered by a fixed and identical voltage allowing only large gross difference errors to be detected (b) Semi-calibrated voltage operation: VREF & VDUT stacks 220 and 210 respectively are powered by fixed but possibly different voltages that are established during a test calibration phase to partially or wholly eliminate interconnect mismatch error as well as transistor offset shift. (c) Calibrated voltage mode: VREF and/or VDUT stacks 220 and 210 respectively are powered by swept voltage sources and BIT A/D output (pass/fail) data is compared and extracted inside the TCA tool to provide higher accuracy resistance equivalency. (d) Semi-calibrated current mode: VREF & VDUT stacks 220 and 210 respectively are powered by fixed but possibly different currents that are established during a test calibration phase to partially or wholly eliminate interconnect mismatch error as well as eliminate transistor mismatch shift. (e) Fully calibrated current mode: VREF and/or VDUT stacks 220 and 210 respectively are powered by either a fixed or swept current source and BIT A/D output (pass/fail) data is compared and extracted inside TCA tool to provide higher accuracy resistance equivalency. This allows full interconnect as well as full transistor mismatch to be eliminated in TCA extraction. In addition swept measurement mode can be used to evaluate and measure process variation of transistor and interconnect for model seeding. This mode allows a single physical design to be used over multiple process generations and splits with only changes to the test program.

In certain embodiments, a TDROM has following differences over standard parametric modules or passive array. (1) Offset matching and calibration errors: The TDROM circuit intrinsically allows minimization or complete removal of these typical errors through either statistical data extraction or direct test methodology program control using the circuit itself as the basis of a calibration process. The standard modules as well as passive arrays do not address these issues. (2) Test speed: Standard parametric modules take up to 10-15 ms per measurement point, while the TDROM test speeds are in the order of 2-5 us per BIT. (3) Defect isolation: Conventional defectivity parametric modules such as the Comb/Serpent structures provides poor isolation of the defect location, while the TDROM enables defect localization to within +/−3 um. Moreover, the independent stack architecture permits detection of soft vs. hard failures as well as discrimination of systematic vs. random defects in a single vehicle. (4) Inline testing at multiple Test Breakout levels: The TDROM can be tested at various test breakout levels in line to study metal level, stress and reliability issues. (5) Similarity to product: Large size (8 Mbits or higher) TDROMs can be efficiently packaged to obtain full coverage of product related issues from litho issues to bonding, packaging issues etc. while standard modules do not allow this. (6) Spatial statistics: Due to the organization of the DUTs/circuits inside an array, true spatial statistics with automatic localization is possible in TDROM while it is not possible with existing standard parametric modules.

Accordingly, some embodiments of the invention form an infrastructure to improve yield of wafer fabrication, based on at least two sources of yield loss: random and systematic. An example of this infrastructure is an addressable array with more than 8000 test structures therein. Each "bit" of the addressable array (of 4 Mb size) consists of a 2-terminal continuity test structure (or DUT, which is an abbreviation of "device under test"). In this design, each "bit" in the addressable array was sized at 3.3×3.3 µm. This area includes the access transistor, so the usable DUT area for experiments is somewhat smaller. The overall footprint was ~8.5×9.5 mm. The array consisted of 64 sub-arrays of 64 kb each. Hence, large data sets are generated by the array, and are used in an appropriately programmed computer 150 (FIG. 11A) to identify yield parameters for use in designing or revising the design of an integrated circuit (IC). Computer 150 is also referred to herein as defectivity monitoring tool 999.

In several embodiments, the addressable array of the previous paragraph is, in some respects, similar to a ROM (and for this reason the addressable array is also called a TDROM), except that in the addressable array, the defects actually "program" the TDROM. With just two transistors between a DUT and the comparator measurement (see FIGS. 2A and 2B), circuit-based yield loss is minimized. Additionally, the entire TDROM, including addressing and access transistors, was implemented in a wafer using thick oxide devices, and followed relaxed design rules. This design of the addressable array resulted in very high circuit yields even in the early stages of technology development.

A probe card containing an off-chip comparator circuit (see FIG. 2A) was used to compare the resistance of a DUT to the resistance of a reference resistor to determine if the DUT is good or bad. In addition to hard opens/shorts yield, some coarse resistance binning information was also obtained by switching between three reference resistors that ranged from 3000 to 10 kΩ.

Additionally, in some embodiments, "Check bits" (bits with known resistors in place of experimental DUTs) were embedded in the array to enable screening of addressing circuit fails and other invalid data. Finally, row and column number labels were included in the design to easily identify a failing DUT for Physical Failure Analysis (PFA).

In an addressable array of the type described above (see paragraph [0036] et seq. above), approximately 90% of the DUTs were random defectivity monitor structures. As would be apparent to the skilled artisan, the random defectivity monitor structures are used to evaluate random yield loss that is generally associated with process and equipment generated particulates that tend to be distributed randomly across the wafer. Accordingly, random defectivity monitor structures used with such an addressable array include combs, serpentines, and single- and stacked-via chains; all designed to nominal design rules. Each layer (active, poly, contact, metal 1-10, via 1-9) was tested for shorts and opens using dedicated DUTs.

In an illustrative embodiment, there were 54 different random defect bit designs due to additional permutations such as orientation, dopant type, and pattern density. Each random defect bit type was arrayed into a half or full 64 kb sub-array block. The allocation of area for each bit type was based on two factors: the relative importance of the level, and the expected detectability of the failure mechanism. In summary, with one instance of the 4 Mb circuit per reticle field, over 2 billion vias, 1 km of serpents, and 1 km of combs per wafer were tested.

Systematic yield loss was also evaluated by use of appropriate test structures with an addressable array of the type described above. Specifically, as will be apparent to the skilled artisan, systematic yield loss occurs when a process is not statistically robust with respect to a given set of design rules, and is usually due to difficulties with: (1) Printing different layer topologies, such as minimum lines with varying pitch and orientation, via arrays, etc; (2) Effectively handling all cases of topology in conjunction with the applied RET; (3) Effectively handling local pattern density variation and its interaction with etch and CMP processes; (4) Handling process excursions such as CD variations and misalignments across die, wafer and lot; and (5) Adverse process-design interaction.

Accordingly, in designing systematic DUTs for the addressable array, an entire set of design rules was reviewed and all physical (i.e. non-implant level) rules that could be tested using a simple continuity structure were schematized. A sample schematic of a systematic test structure is shown in FIG. 3A. A specification table listing the experiment type, location in the array, design parameters, and design values was then created (an example is shown in FIG. 3C, with a description of the design parameters shown in FIG. 3B). The specification tables were input to an automated "DUT generator" infrastructure that generated and placed the DUTs in the array. A total of 8108 unique test structures were created. They can be broadly classified as: (1) Printability test structures; (2) Misalignment monitors; (3) Minimum feature area test structures; (4) OPC test structures; (5) SRAM bitcell topography experiments; (6) Special topologies to check for known systematic yield loss mechanisms. Multiple replicas of each DUT were placed in the array to generate statistical fail rate data. Note that systematic DUTs took up only about 10% of the total DUT area, but their design was more involved.

To minimize wafer test time but remain compatible with basic memory testers, a 16-bit word was chosen for the I/O of the addressable circuit. With 8 to 12 VDD/VSS pad redundancy, the total pad count was 73. The 4 Mb circuit had a native test speed of up to 1 MHz, limited by the fact that it was a true analog comparator type measurement. The circuit had a native test time of less than 3 seconds per die. However, the overall test time was gated by the tester data writing speeds and was about 40 min. per wafer. Considering a experiment of >8000 DUTs and 10-20 parameters per DUT (DUT location and type, layer, and design variable values) the analysis database required over 100,000 design parameters. For test chips of this complexity in 65 nm technology development, it is imperative to leverage the just-described infrastructure for "correct by construction" layout, documentation, and analysis template generation. The design parameters were directly sent to the analysis software database in an appropriately programmed computer, so that they were available for interactive data analysis without the delay, or potential for errors, associated with human involvement. The analysis platform handled >100 MB/wafer of data with about 100 wafers per week tested.

Figure 4A:
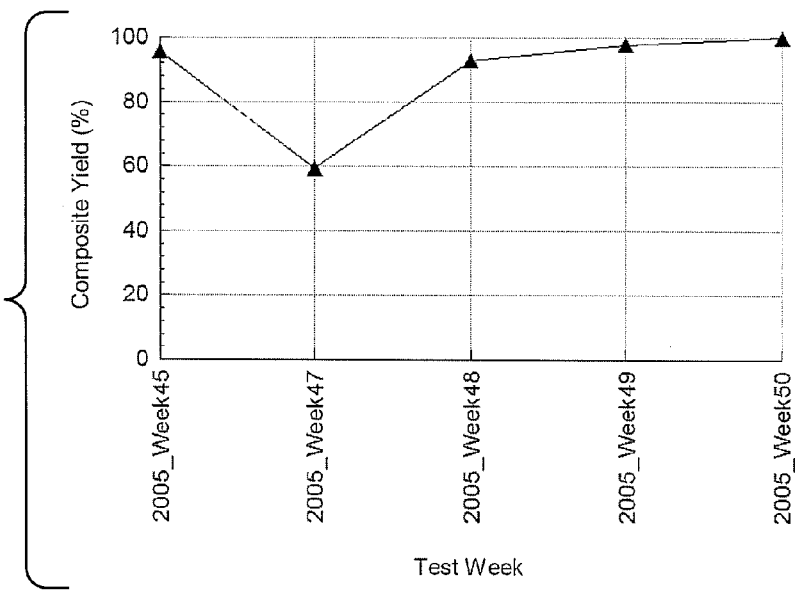
FIGS. 4A and 4B illustrate examples of random defectivity auto-reporting based on use of the circuit of FIGS. 1 and/or 2, with FIG. 4A showing composite die yield of all random defect mechanisms and FIG. 4B showing metal 1-4 breakout of opens defect density by lot.
Figure 4B:
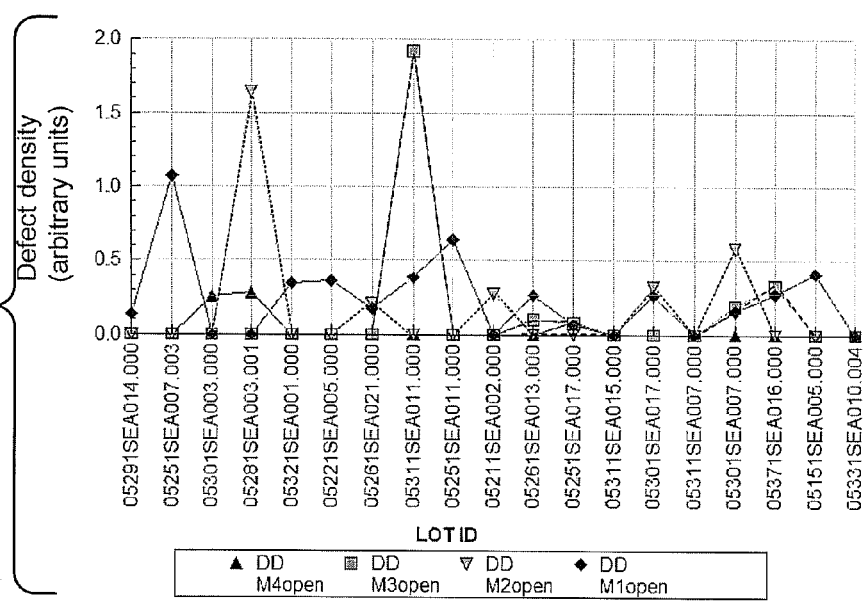
Figure 5:
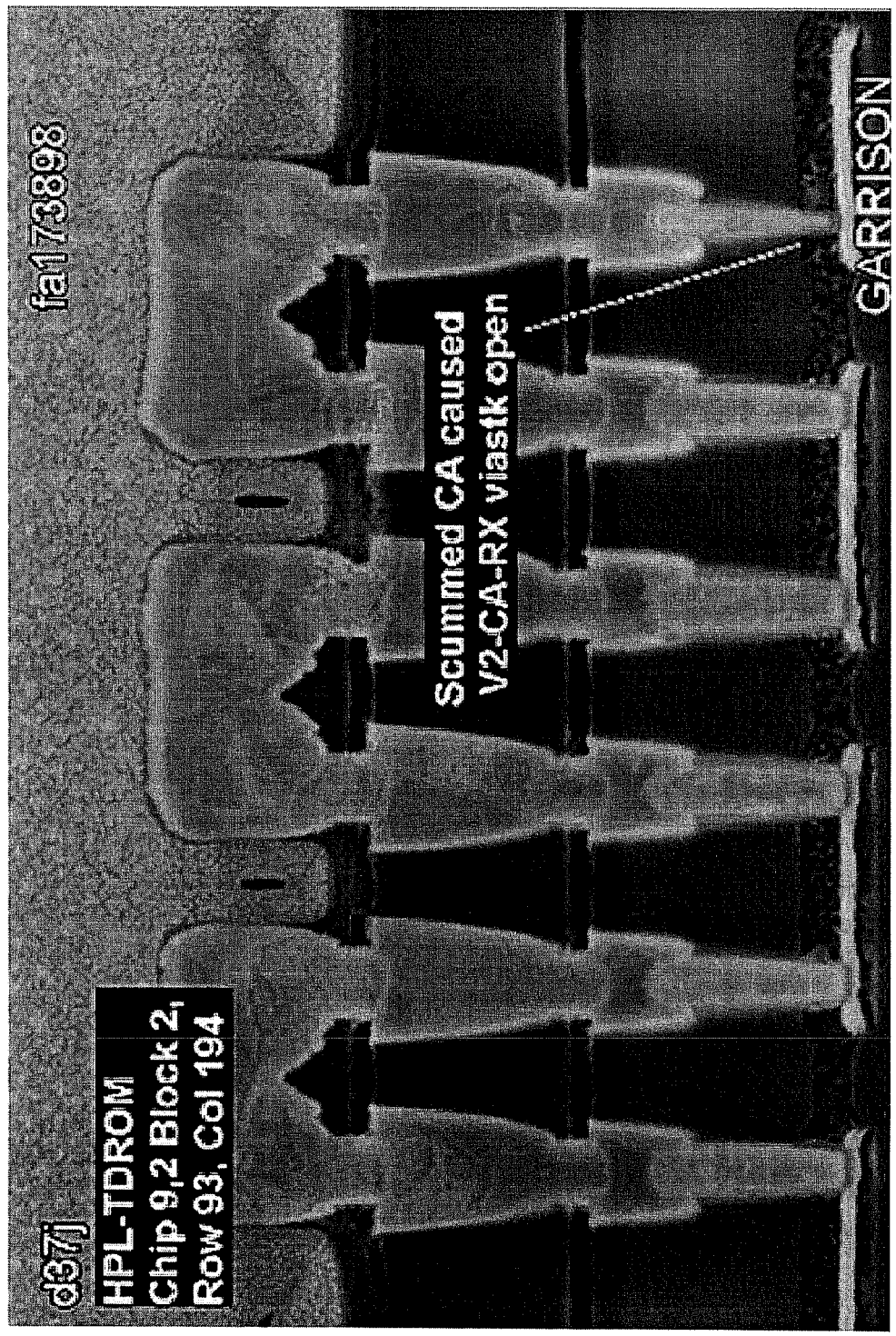
FIG. 5 illustrates a sample cross-sectional SEM image of a failed stacked via DUT in the addressable array of FIG. 2; wherein the localization of any failure to a single DUT several microns across is an advantage for PFA.

The addressable array circuit was designed to target the yield characterization limitations of conventional passive test chips and to improve visibility to random yield issues. The primary analysis result goals were: (1) Defect density Paretos by layer; (2) Random defect bit failure visualization by die and wafer; (3) Soft via failure detection; (4) Physical X/Y locations for PFA; (5) Defectivity summary calculation and kill ratios; (6) Correlation of random yield to other test structure and product yield data. Analysis templates are run regularly and a predefined analysis report is produced. This report starts with a high-level composite random defect limited yield but also provides yield information by layer, and by structure type. Critical areas of the random defect monitor structures were extracted and used to calculate normalized defect densities. Summary yield or defect density information can then be displayed in any normal format, such as trend by lot, trend by date, Pareto, wafer contour maps, etc. An example of the composite yield trend chart is shown in FIG. 4A, while FIG. 4B shows a sample defect density trend chart by lot for a specific failure mechanism (metal opens, in this case). In addition, failed DUTs can be highly localized. Via failures, for instance, are recorded and localized to groups of 2-40 vias. This localization capability helped achieve a high PFA hit rate and, in turn, an increase in productivity in root cause determination and yield improvement. FIG. 5 shows a sample cross-sectional SEM image of a failed stacked via DUT.

Figure 6:
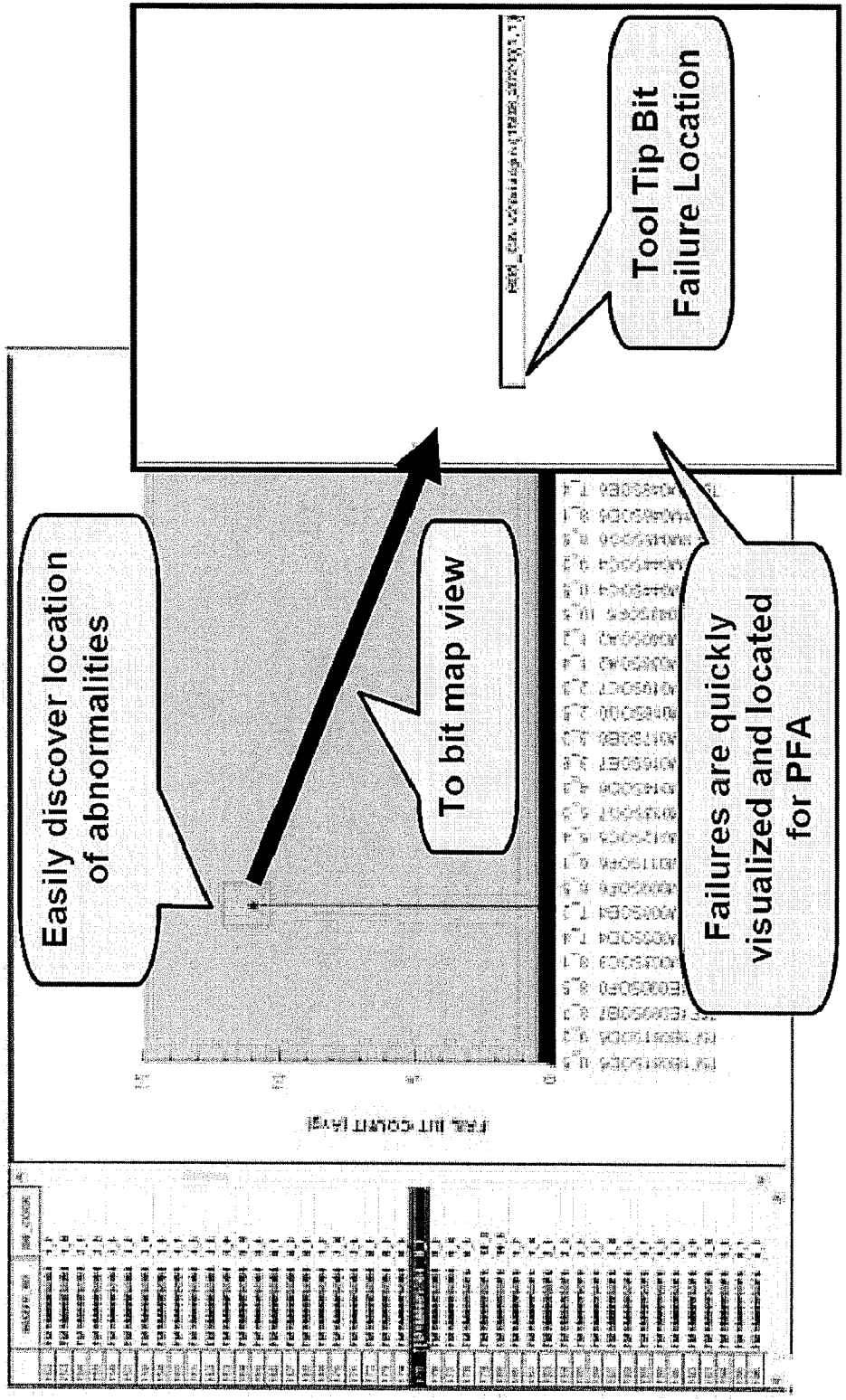
FIG. 6 shows, in a computer display, an example of interactive drill-down features in the analysis software, using the data generated by the circuit of FIG. 2.

An example of the software use in drill-down analysis is shown in FIG. 6. The bit location information shown in tooltip form is also available as an exportable file to aid in PFA. Another key feature of this design is the ability to see low failure-rate resistive or "soft" via failures. Even though this array circuit is primarily a 2-terminal continuity tester, a coarse resistance resolution capability was designed in to provide visibility to resistive defects that are not noticed by conventional passive test structures or by voltage contrast analysis. Contact and via soft fails being a key yield limiter at 90 nm node and below, the ability to see soft via failures is a major advantage of this array circuit.

As mentioned earlier, a basic set of systematic yield monitoring experiments for 65 nm requires 1000's of individual tests. Using less than 10% of the area of the 4 Mb circuit (6 out of 64 sub-arrays), 39 copies each of >8000 systematic yield DUTs were tested, or >300,000 systematic DUTs per die. Thus, meaningful failure statistics were generated for each systematic yield concern by lot, wafer, die, and across-die. Without linked targeted analysis templates, the vast amount and variety of data generated is overwhelming and unusable. Thus, a key feature of the infrastructure using the circuit of FIG. 2 is the ability to automatically receive design parameters from the DUT layout generator, aggregate failure signatures according to the designed-in bit variations, and then directly convert these failure signature counts into yield parameters. Note, however, that the specific manner in which the data is aggregated and converted into yield parameters is not a critical aspect of the invention, and can be performed in numerous different ways depending on the embodiment.

Figure 7:
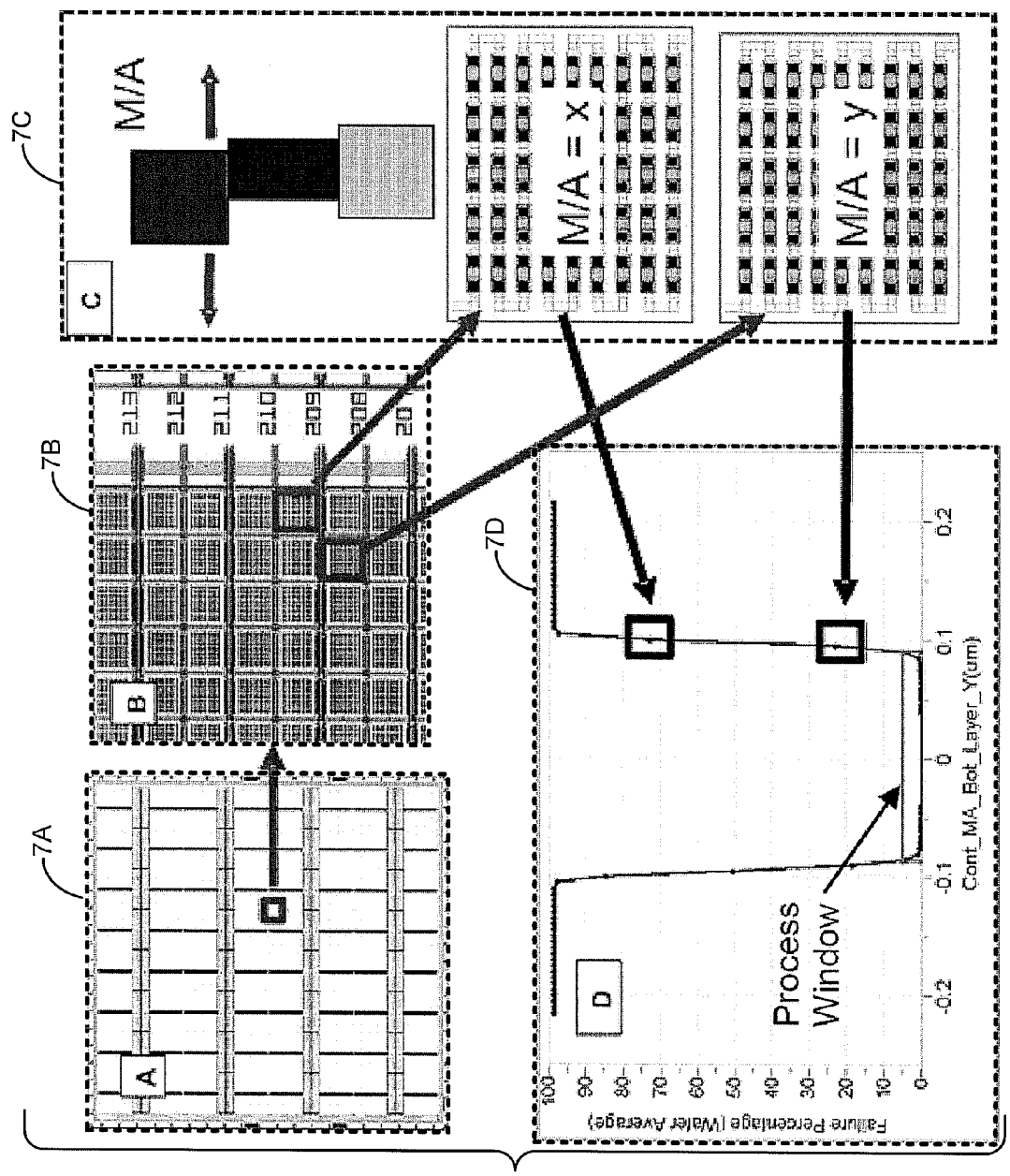
FIG. 7 illustrates an electrical vernier design and results from use of the circuit of FIG. 2 as follows: 7A illustrates a 64×64 kb circuit; 7B illustrates a DUT array section; 7C shows a cross-sectional depiction of M/A and planar view layout of two via chain DUTs; and 7D is a final analysis view wherein each X-Y point represents a failure rate of a unique bit design, and a horizontal box at the bottom of 7d is the automatically-extracted process window.

FIG. 7 shows a snapshot of an analysis platform displaying a set of electrical overlay verniers for a specific layer, design rule, and set of intentional misalignment values. In FIG. 7, 7D is an example of the automatic output from the analysis software. The analysis view in FIG. 7 represents 38 different bit designs with varying top metal misalignment to via, aggregated into a failure rate with about 1200 redundant placements per wafer (39 copies per die×30 die per wafer), for a total of 44,000 electrical tests. This is referred to as a "group" of bit experiments. Each experiment group has one dependent variable and can be aggregated and visualized for systematic yield analysis in the software.

The process window parameters can be extracted for each of the approximately 2000 groups, and can be visualized in a way that is analogous to a set of process capability metrics (Cpk) monitored electrically through failure statistics. For each set of 39 copies of a bit design, 9 check bits are also placed, which are used to screen out the noise introduced by large defects and to verify circuit functionality even when testing groups of bits in which bit failure is intentional by design, for instance, the −0.2 μm misalignment result 7D. Full check rows are also used, and the analysis software automatically labels as "excluded" any bits which are affected by bad check bit or check row results.

Figure 8A:
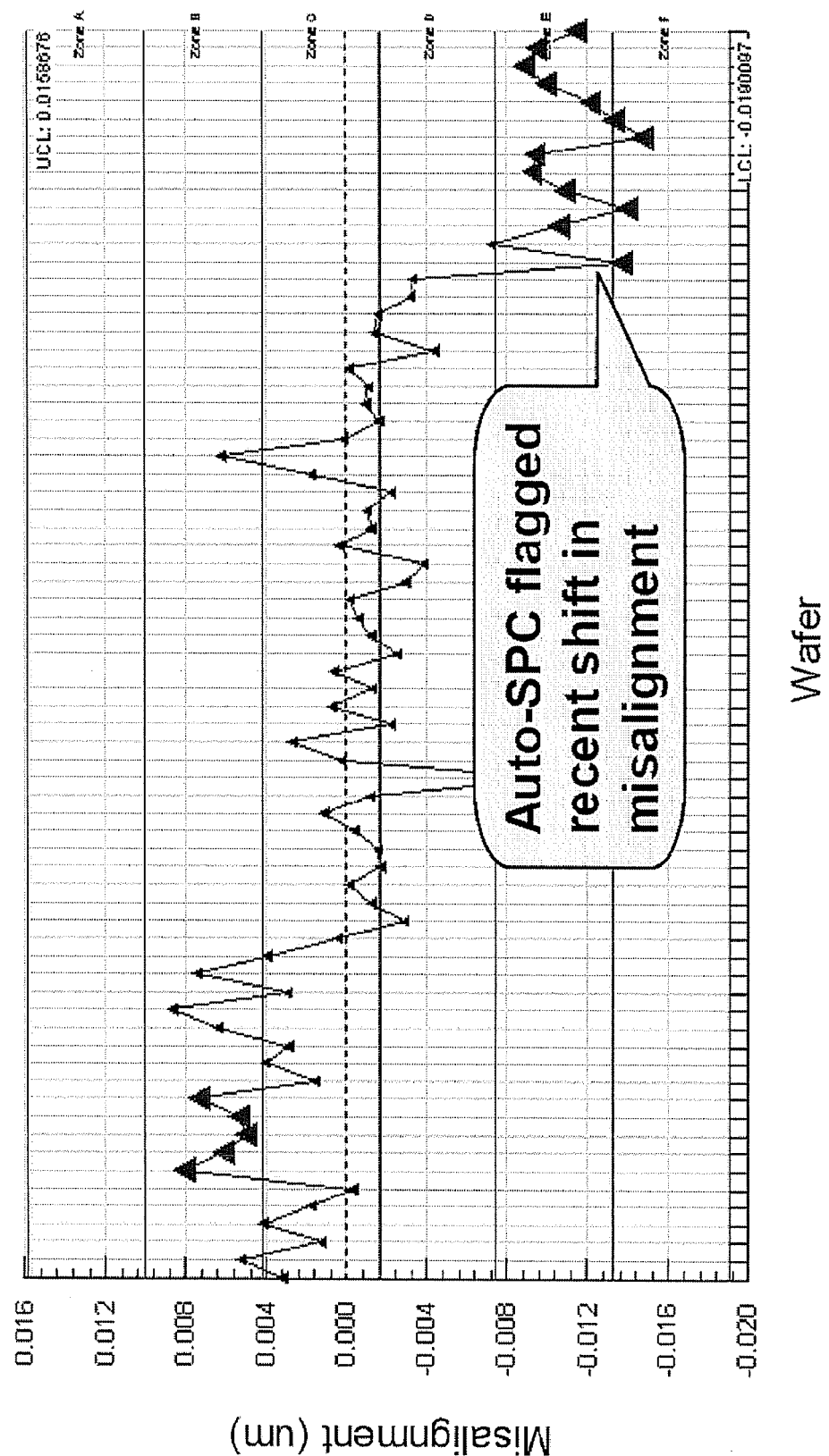
FIG. 8A shows metal-via misalignment tracked by use of the circuit of FIG. 2 as a trend chart.
Figure 8B:
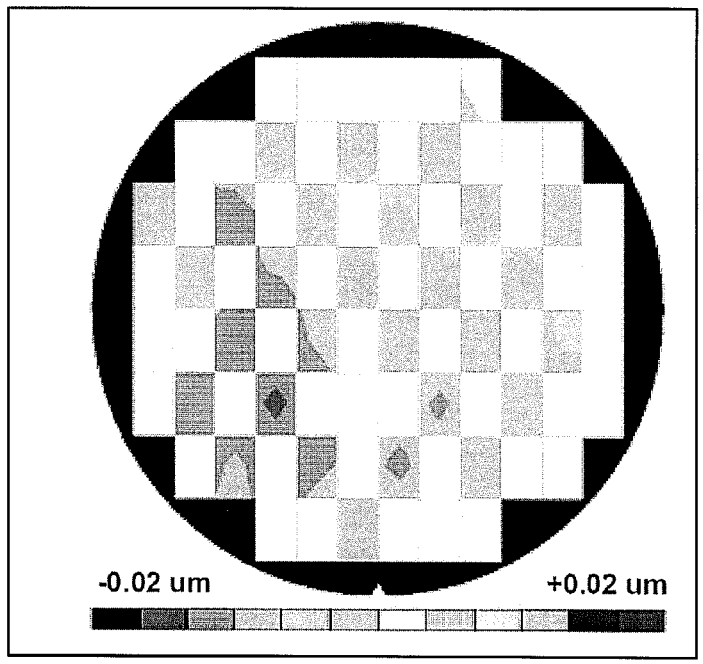
FIG. 8B illustrates drill-down of negative misalignment results to wafer contour map, by use of the circuit of FIG. 2.
Figure 9:
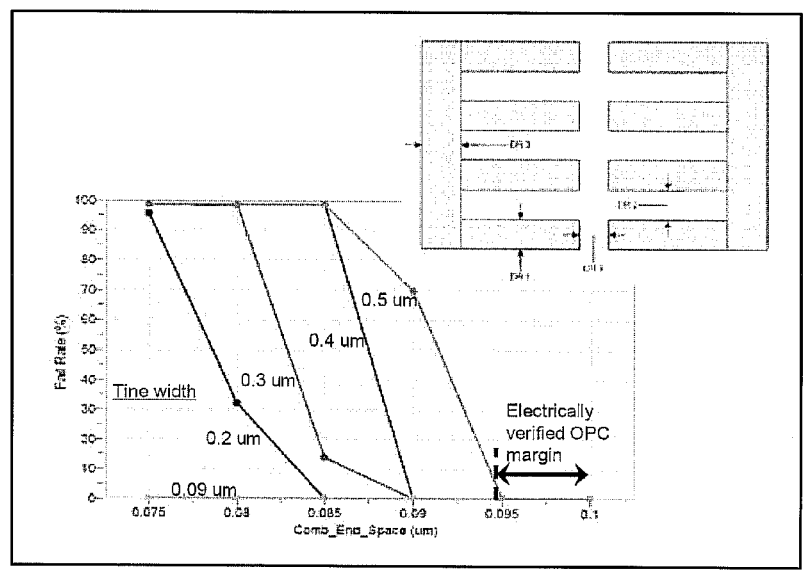
FIG. 9 illustrates conducting layer end-to-end space tests for OPC process window verification by use of the circuit of FIG. 2.

The stored process window parameters are all available for further standard analyses such as Pareto, trend chart and Statistical Process Control (SPC) analysis, correlation to inline metrology data, correlation to process qualification circuit yields, bit-mapping, wafer-mapping, etc. An example of how the process window parameter in FIG. 7 can be used is shown in the Auto-SPC results of FIG. 8A. The group of wafers on the right in FIG. 8A was highlighted by the auto-SPC function of the analysis software. Those results were interactively selected on the chart for wafer contour map drill-down analysis, and a wafer gradient component to the misalignment shift was quickly and easily visualized as shown in FIG. 8B. FIG. 9 shows an additional example of the wide variety of systematic yield tests included on this chip, along with the data analysis output. The plot shows 6 values of comb, and comb end space permuted with 5 values of tine width, 2 comb tine orientations and 2 dopant types, for a total of 120 bit layout variations. This experiment is for just one conducting layer. Thus, a budget of 8000 experiments for systematic yield learning can be quickly used.

As will be apparent to a skilled artisan on review of FIGS. 1 and 2, any of a number of different methods may be used to design a range of experiments to use a differential defectivity monitoring circuit to identify any change in (a) output response of and (b) size of transistor(s) in a DUT, by measurement of a corresponding change in resistance of the DUT relative to a reference device. An illustration of the type of method which can be used with the circuit of FIG. 2 is now described in reference to FIG. 10A. Specifically, in act 1001, various damage thresholds of structures in a wafer, such as vias are determined (for a given wafer fabrication process). The thresholds that are determined may identify instantaneous failures and/or failures over long term (i.e. any failures of concern to an IC designer). At this stage, various thermal limits are also determined in some embodiments, as per act 1002. The thermal limits may arise from, for example, electromigration. In act 1003, the accuracy, of various measurements that can be performed on a wafer, is determined (e.g. of electrical parameters such as resistance and capacitance) for capture of one or more phenomena to be measured (such as resistance shift, open shorts and misalignment). Next, act 1004 is performed, to determine output response(s) of a circuit of the type illustrated in FIG. 2 (e.g. swept voltage on each terminal, such as a sloped analog voltage response). For the types of response that can be measured in act 1004. Act 1004 is followed by act 1005 wherein transistors (of a DUT) are sized appropriately, to provide a voltage response (from pad 231 in FIG. 2) that meets a predetermined condition. The predetermined condition may be, for example, $V_{out}/R_{DUT}$ greater than an acceptable error for IC design (i.e. any limit identified in a specification of the IC design). Measurements from performing such experiments are used to change (i.e. re-design) an existing IC design (e.g. by use of a process window shown in display 7D of FIG. 7) thereby to output a new IC design, as discussed below in the next several paragraphs. FIG. 10B illustrates an example of successfully seeing soft via fail defects by use of the circuit of FIG. 2.

Figure 10A:
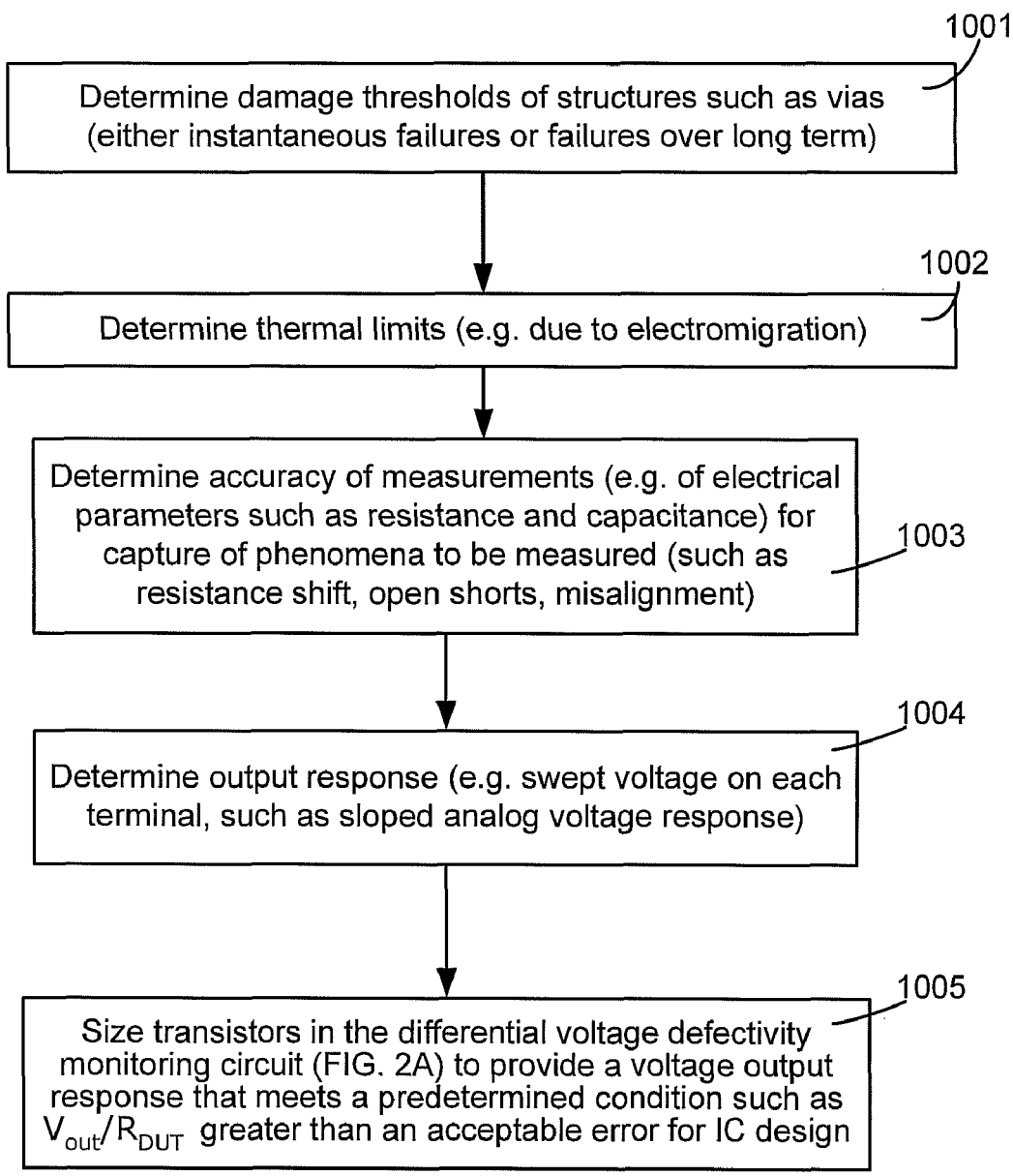
FIG. 10A illustrates a method of sizing transistors used in the circuit of FIGS. 1 and 2.
Figure 10B:
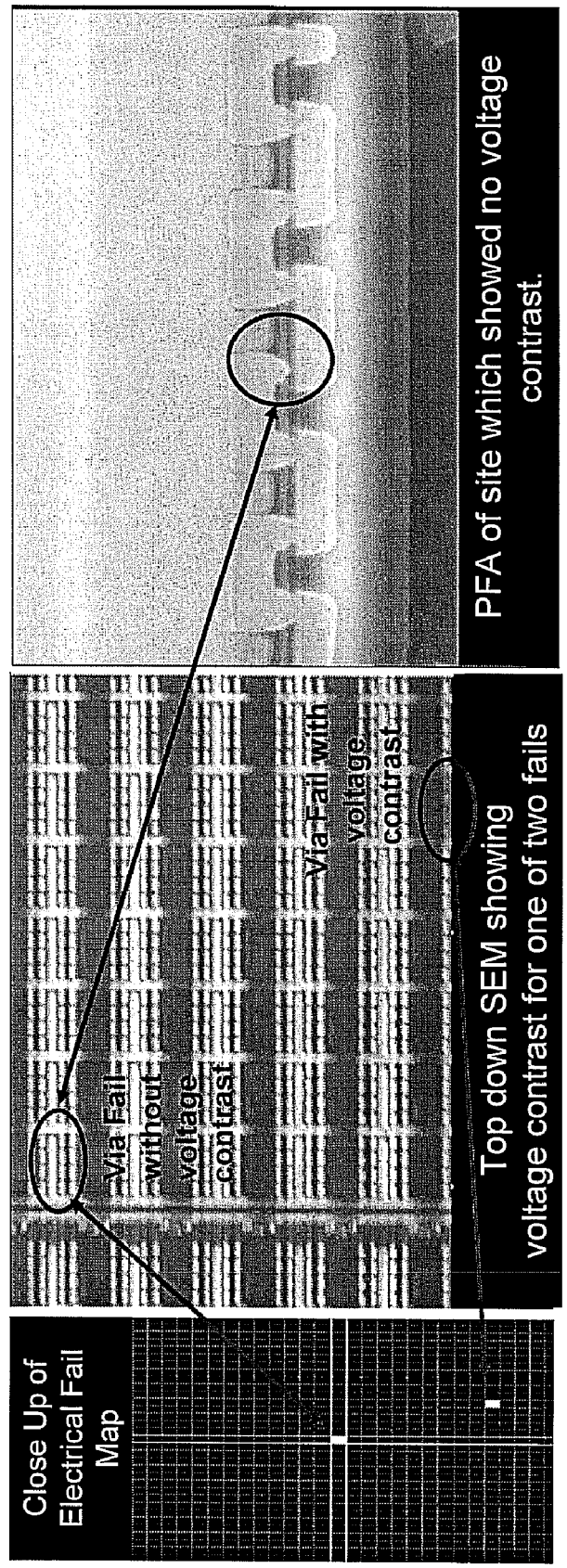
FIG. 10B illustrates an example of successfully seeing soft via fail defects by use of the circuit of FIG. 2.
Figure 10C:
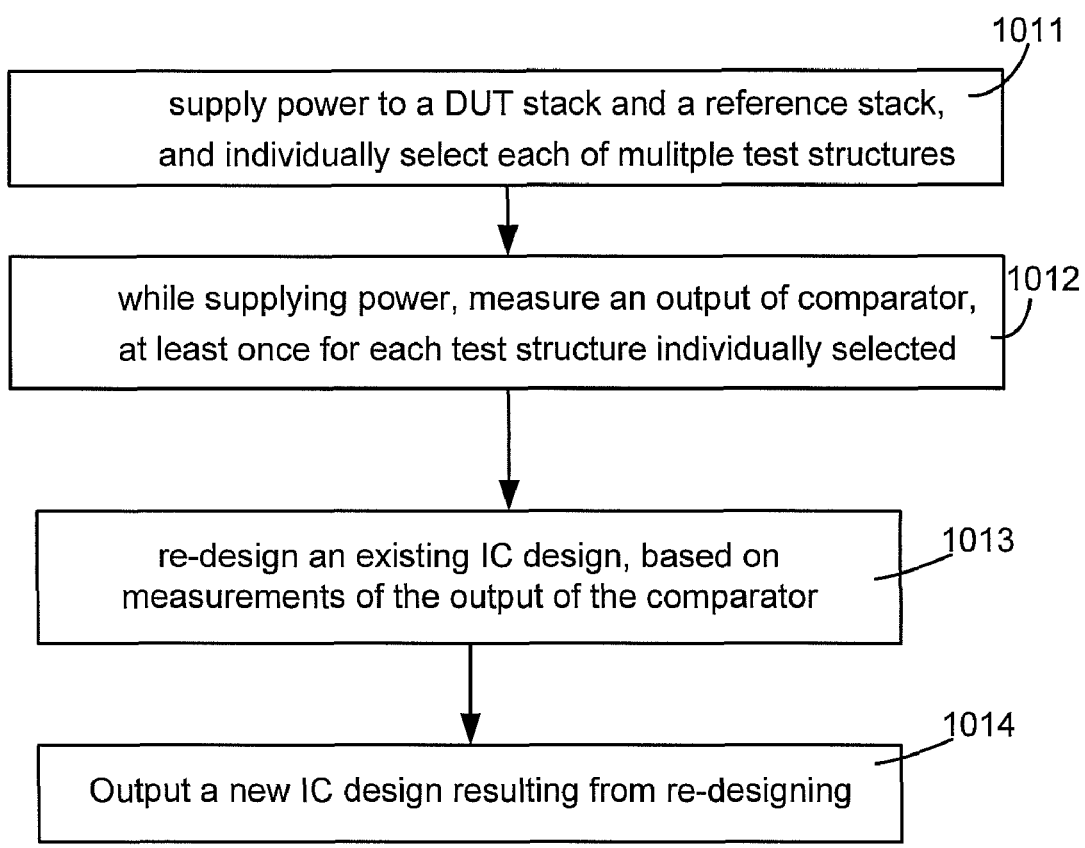
FIG. 10C illustrates a method for using the circuit of FIG. 2 in re-designing an IC circuit in some embodiments of the invention.

In one illustrative embodiment shown in FIG. 10C, power is supplied to a DUT stack 210 and a reference stack 220 (FIG. 2) simultaneously, and each of multiple test structures is individually selected. As will be apparent to the skilled artisan, each of structures 214_0 . . . 214_N illustrated in FIG. 2 is selected by appropriately supplying signals on respective control lines WL0 . . . WL (in this illustration, N=255). While supplying power, output of comparator 230 is measured as per act 1012, at least once for each test structure that is individually selected. Next, in act 1013, an existing IC design is re-designed, based on the measurements in act 1012. Finally, the new IC design which results from act 1013 is output in act 1013.

Process 910 (FIG. 11B) of some embodiments of the invention is composed of a number of stages 912-930 (also in FIG. 11B), shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC. A brief description of the components of the EDA software design process (stage 910) will now be provided.

System design (stage 912): The circuit designers describe the functionality that they want to implement, they can perform what-if planning to refine functionality, check costs, etc. Hardware-software architecture partitioning can occur at this stage. Exemplary EDA software products from Synopsys, Inc. that can be used at this stage include Model Architect, Saber, System Studio, and DesignWare® products.

Logic design and functional verification (stage 914): At this stage, the VHDL or Verilog code for modules in the system is written and the design (which may be of mixed clock domains) is checked for functional accuracy. Exemplary EDA software products from Synopsys, Inc. that can be used at this stage include VCS, VERA, DesignWare®, Magellan, Formality, ESP and LEDA products.

Synthesis and design for test (stage 916): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this stage include Design Compiler®, Physical Compiler, Test Compiler, Power Compiler, FPGA Compiler, Tetramax, and DesignWare® products.

Design planning (stage 918): Here, an overall floorplan for the chip is constructed and analyzed for timing and top-level routing. Exemplary EDA software products from Synopsys, Inc. that can be used at this stage include Jupiter and Floorplan Compiler products.

Netlist verification (stage 920): At this step, the netlist is checked for compliance with timing constraints and for correspondence with the VHDL/Verilog source code. Exemplary EDA software products from Synopsys, Inc. that can be used at this stage include VCS, VERA, Formality and PrimeTime® products (applied to pre-layout IC designs). Note that timing analysis at this stage is performed in PrimeTime® based on simplified models that do not take into account capacitive coupling and crosstalk.

Figure 11A:
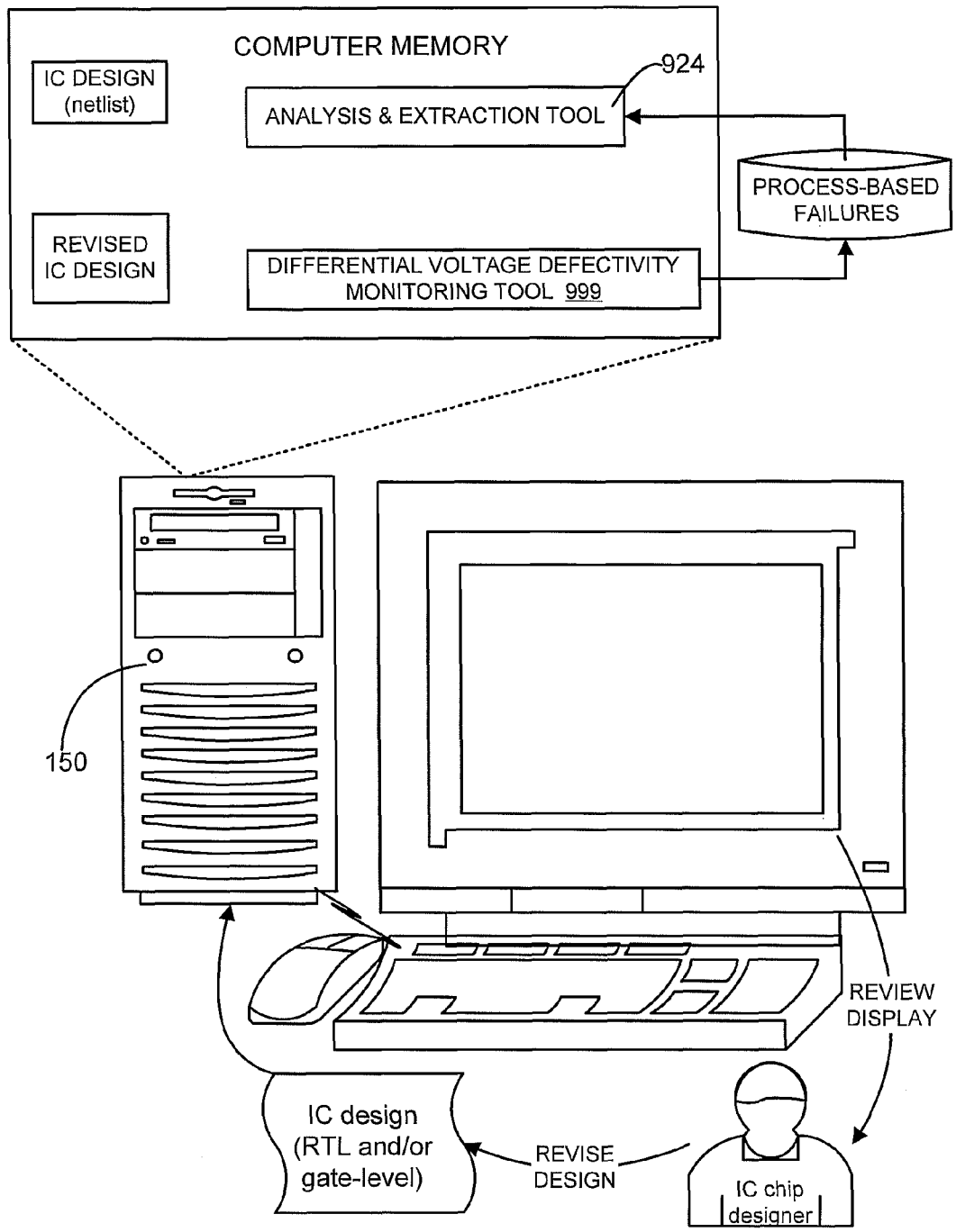
FIG. 11A illustrates, in a block diagram, a computer that is programmed in accordance with the invention.

Physical implementation (stage 922): The placement (positioning of circuit elements, such as the above-described sequential cells and combinational cells) and routing (connection of the same) occurs at this step. Exemplary EDA software products from Synopsys, Inc. that can be used at this stage include the Astro product. Although circuitry and portions thereof (such as rectangles) may be thought of at this stage as if they exist in the real world, it is to be understood that at this stage only a layout exists in a computer 150 (FIG. 11A). The actual circuitry in the real world is created after this stage as discussed below.

Figure 11B:
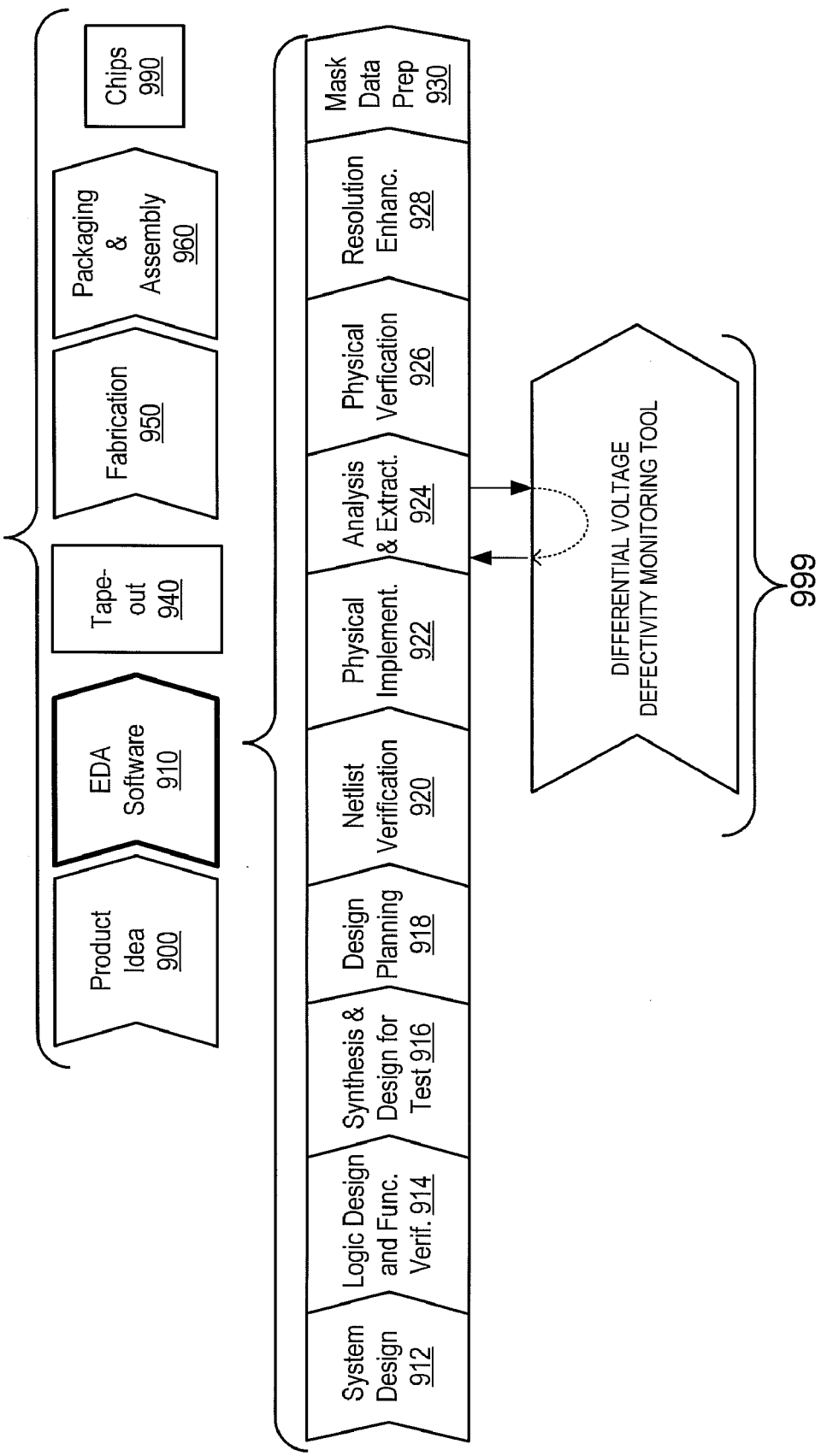
FIG. 11B illustrates, a simplified representation of an exemplary digital ASIC design flow in accordance with the invention.

Analysis and extraction (stage 924): At this step, the circuit function is verified at a transistor level, this in turn permits what-if refinement. Exemplary EDA software products from Synopsys, Inc. that can be used at this includes Star RC/XT, Raphael, Aurora and PrimeTime® SI products (applied to post-layout IC designs). Note that timing analysis at this stage is performed in PrimeTime® SI based on capacitive coupling and crosstalk models. Hence, some embodiments use PrimeTime® SI at this stage. Note that a defectivity monitoring tool 999 (of the type described above in reference to FIG. 11A) can be used in an iteration through this stage 924, as shown in FIG. 11B.

Physical verification (stage 926): At this stage various checking functions are performed to ensure correctness for: manufacturing, electrical issues, lithographic issues, and circuitry. Exemplary EDA software products from Synopsys, Inc. that can be used at this stage include the Hercules product.

Resolution enhancement (stage 928): This involves geometric manipulations of the layout to improve manufacturability of the design. Exemplary EDA software products from Synopsys, Inc. that can be used at this stage include iN-Phase, Proteus, and AFGen products.

Mask data preparation (stage 930): This provides the "tape-out" data for production of masks for lithographic use to produce finished chips. Exemplary EDA software products from Synopsys, Inc. that can be used at this include the CATS(R) family of products. Actual circuitry in the real world is created after this stage, in a wafer fabrication facility (also called "fab").

The data structures and software code for implementing one or more acts described in this detailed description can be encoded into a computer-readable medium, which may be any storage medium and/or any transmission medium that can hold code and/or data for use by a computer. Storage medium includes, but is not limited to, magnetic and optical storage devices such as disk drives, magnetic tape, CDs (compact discs), and DVDs (digital versatile discs). Transmission medium (with or without a carrier wave upon which the signals are modulated) includes but is not limited to a wired or wireless communications network, such as the Internet. In one embodiment, the transmission medium uses a carrier wave that includes computer instruction signals for carrying out one or more steps performed by the methods illustrated in FIG. 10A. In another embodiment, the transmission medium uses a carrier wave that includes instructions to use the circuit of and perform the method of FIGS. 2 and 10A respectively.

Note that a computer system used in some embodiments to implement a differential voltage defectivity monitoring tool 999 using respectively the circuit of and to perform the method of FIGS. 2 and 10A, uses one or more linux operating system workstations (based on IBM-compatible PCs) and/or unix operating systems workstations (e.g. SUN Ultrasparc, HP PA-RISC, or equivalent), each containing a 2 GHz CPU and 1 GB memory, that are interconnected via a local area network (Ethernet).

A computer-implemented method of simulating variation in an attribute of a circuit includes using a computationally expensive technique to simulate the attribute (such as timing delay or slew) of a stage in the circuit, at predetermined values of various parameters (e.g. nominal values of channel length or metal width), to obtain at least one simulated value of the attribute. The method also uses a computationally inexpensive technique to estimate the same attribute, thereby to obtain at least one estimated value which is less accurate than the simulated value. Then the computationally inexpensive technique is repeatedly used on other values of the parameter(s), to obtain a number of additional estimated values of the attribute. Applying to the additional estimated values, a function obtained by calibrating the at least one estimated value to the at least one simulated value, can yield calibrated estimates very quickly, which represent the attribute's variation relatively accurately.

Numerous modifications and adaptations of the embodiments described herein will become apparent to the skilled artisan in view of this disclosure.

What is claimed is:

1. A method of designing an integrated circuit (IC) in a wafer, the method comprising:
   simultaneously supplying power to each of a first stack having a plurality of first inputs coupled to a plurality of devices under test (DUTs) located within the wafer and a second stack having a plurality of second inputs coupled to a plurality of reference devices located within the wafer;
   wherein each of the first stack and the second stack comprises a first-type device and at least two second-type devices;
   wherein the first-type device is one of a p-channel device or an n-channel device;
   wherein each second-type device is the other of the p-channel device or the n-channel device;
   during said simultaneously supplying, comparing a first output from said DUTs and a second output from said reference device;
   re-designing an existing IC design, based on at least an output resulting from said comparing; and
   outputting a new IC design resulting from said re-designing.

2. The method of claim 1 wherein:
   an identical voltage is supplied to each of the DUTs and the reference device during said simultaneously supplying.

3. The method of claim 1 wherein:
   different voltages are supplied to each of the DUTs and the reference device during said simultaneously supplying.

4. The method of claim 1 wherein:
   swept voltages are supplied to each of the DUTs and the reference device during said simultaneously supplying.

5. The method of claim 1 wherein:
   different currents are supplied to each of the DUTs and the reference device during said simultaneously supplying.

6. The method of claim 1 wherein:
   swept currents are supplied to each of the DUTs and the reference device during said simultaneously supplying.

7. The method of claim 1 wherein:
   at least one characteristic of a device under test (DUT) in the first stack has a predetermined relationship with a corresponding characteristic of at least one reference device in the second stack.

8. A non-transitory computer-readable storage medium comprising data structures and software code to perform a method of designing an integrated circuit (IC) in a wafer, the software code comprising:

computer instructions to simultaneously supply power to each of a first stack having a plurality of first inputs coupled to a plurality of devices under test (DUTs) located within the wafer and a second stack having a plurality of second inputs coupled to a plurality of reference devices located within the wafer;

wherein each of the first stack and the second stack comprising a first-type device and at least two second-type devices;

wherein the first-type device is one of a p-channel device or an n-channel device;

wherein each second-type device is the other of the p-channel device or the n-channel device;

wherein at least one characteristic of a device under test (DUT) in the first stack has a predetermined relationship with a corresponding characteristic of at least one reference device in the second stack;

computer instructions to compare a first output from said DUT and a second output from said reference device during execution of the computer instructions to simultaneously supply power;

computer instructions to re-design an existing IC design, based on at least an output resulting from execution of said computer instructions to compare; and computer instructions to output a new IC design resulting from said re-designing.

9. The non-transitory computer-readable storage medium of claim 8 wherein:

an identical voltage is supplied to each of the DUTs and the reference device during execution of said computer instructions to simultaneously supply power.

10. The non-transitory computer-readable storage medium of claim 8 wherein:

different voltages are supplied to each of the DUTs and the reference device during execution of said computer instructions to simultaneously supply power.

11. The non-transitory computer-readable storage medium of claim 8 wherein:

swept voltages are supplied to each of the DUTs and the reference device during execution of said computer instructions to simultaneously supply power.

12. The non-transitory computer-readable storage medium of claim 8 wherein:

different currents are supplied to each of the DUTs and the reference device during execution of said computer instructions to simultaneously supply power.

13. The non-transitory computer-readable storage medium of claim 8 wherein:

swept currents are supplied to each of the DUTs and the reference device during execution of said computer instructions to simultaneously supply power.

* * * * *